US012109161B2

(12) United States Patent
De Jonge et al.

(10) Patent No.: US 12,109,161 B2
(45) Date of Patent: Oct. 8, 2024

(54) VIBRATING STATIONARY EXERCISE MACHINE

(71) Applicant: Hendrik Jan De Jonge, Port Elizabeth (CA)

(72) Inventors: Hendrik Jan De Jonge, Port Elizabeth (CA); Isaac Louis Rautenbach, Port Elizabeth (CA)

( * ) Notice: Subject to any disclaimer, the term of this patent is extended or adjusted under 35 U.S.C. 154(b) by 359 days.

(21) Appl. No.: 17/430,340

(22) PCT Filed: Feb. 14, 2019

(86) PCT No.: PCT/ZA2019/050006
§ 371 (c)(1),
(2) Date: Aug. 12, 2021

(87) PCT Pub. No.: WO2020/168364
PCT Pub. Date: Aug. 20, 2020

(65) Prior Publication Data

US 2022/0125660 A1 Apr. 28, 2022

(51) Int. Cl.

*A61H 1/00* (2006.01)
*A63B 21/00* (2006.01)
*A63B 22/06* (2006.01)

(52) U.S. Cl.

CPC ........... *A61H 1/005* (2013.01); *A63B 21/154* (2013.01); *A63B 21/4034* (2015.10); *A63B 22/06* (2013.01); *A61H 2201/1261* (2013.01)

(58) Field of Classification Search

CPC ........ A63B 22/06–0694; A63B 21/154; A63B 21/4034; A63B 21/00196; A63B 22/0046; A63B 22/0056; A63B 22/0664; A63B 69/16; A63B 22/0605; A61H 1/005; A61H 2201/1261

See application file for complete search history.

(56) References Cited

U.S. PATENT DOCUMENTS

| | | | | |
|---|---|---|---|---|
| 4,971,316 A * | 11/1990 | Dalebout | ............. A63B 22/001 482/62 |
| 11,154,747 B2 * | 10/2021 | Frost | .................. A63B 22/0664 |
| 2015/0045190 A1 | 2/2015 | Keiser | |
| 2018/0236294 A1 * | 8/2018 | Frost | ................ A63B 21/00196 |
| 2021/0228929 A1 * | 7/2021 | Mischi | ...................... B62M 3/16 |
| 2023/0096156 A1 * | 3/2023 | Cho | .................. A63B 22/0605 482/57 |

FOREIGN PATENT DOCUMENTS

| | | |
|---|---|---|
| DE | 202014101665 | 8/2014 |
| WO | 2018157181 A1 | 8/2018 |

OTHER PUBLICATIONS

International Search Report and Written Opinion issued in PCT application No. PCT/ZA2019/050006, mailing date Nov. 13, 2019.

* cited by examiner

*Primary Examiner* — Joshua Lee
*Assistant Examiner* — Catrina A Letterman
(74) *Attorney, Agent, or Firm* — BENESCH, FRIEDLANDER, COPLAN & ARONOFF LLP

(57) ABSTRACT

The invention provides an exercise machine (10) of the type which have pedals (38) or foot plates through which a person can, in use, transfer kinetic energy to the machine, which machine comprises a means for vibrating the pedals or foot plates during exercise. The exercise machine includes a mechanism (40) to engage or disengage the vibration.

5 Claims, 9 Drawing Sheets

SECTION VIEW

VIBRATING STATIONARY EXERCISE MACHINE

TECHNICAL FIELD OF THE INVENTION

This invention relates to stationary exercise machines.

BACKGROUND TO THE INVENTION

The inventor is aware of the beneficial effects of vibrations during exercises. Vibrations in the range of 30 to 35 Hertz is believed to be most beneficial for recovery and injury prevention during and after exercise.

However, mechanically complex exercise machines such as bicycles, stationary bicycles, elliptical exercise machines such as, stepping machines, cross trainers and the like machines have not been able to successfully incorporate vibration technology due to the destructive effect of such vibrations on the bearings and pivot points of such machines.

The applicant is aware of a patent application for a Stationary Exercise Machine having the PCT patent application number PCT/ZA2018/050011.

It is an object of the invention to provide an improved vibrating exercise machine.

GENERAL DESCRIPTION OF THE INVENTION

According to the invention there is provided an exercise machine of the type which have pedals or foot plates through which a person can, in use, transfer kinetic energy to the exercise machine, which exercise machine comprises a vibrating mechanism or arrangement for directly vibrating the pedals or foot plates during exercise, and which exercise machine includes a mechanism to switch the vibration on or off.

The exercise machine may be selected from the group comprising a bicycle, stationary exercise bicycle, an elliptical exercise type machine, stepping machine or the like.

It is to be understood and appreciated that vibration is caused directly to the pedal or footplate, which places the vibration energy closest to the person doing exercises and minimizes damaging vibrations transmitted to the machine and its components. It is preferred that the mounting means of the pedal or footplate vibrates.

The preferred means for vibrating the pedals or foot plates during exercise may be a rotatable pedal or footplate mounting shaft of which the rotation axis and the pedal or footplate mounting point is offset to cause a wobble, vibration or oscillation of the pedal or footplate as the shaft is rotated during exercise. The means for vibrating the pedals includes a means to rotate the mounting shaft during exercise. Alternatively, the means for vibrating the pedals or foot plates during exercise may be an electrical vibration motor mounted to the footplate or pedal.

In the case of a bicycle or stationary exercise bicycle, the bicycle comprising:

at least one, preferably a pair of round rotatably lockable gears or rotatably lockable pulleys respectively mounted on each side of the bicycle and with a circumference similar to the rotation circumference of rotating pedal shafts of the bicycle;

a pair of crank arms rotatably mounted to the bicycle and connected at one end of each crank arm through a bottom bracket of the bicycle, which bottom bracket extends through the middle of the rotatably lockable gears or rotatably lockable pulleys;

a shaft rotatably mounted through a hole defined in the free end of each crank arm with one end extending inwards towards the bicycle and provided with a coaxial gear or coaxial pulley respectively engaging the rotatably lockable gears or pulley, as the case may be, with the other outwardly extending end provided with a socket for receiving a shaft of a bicycle pedal, which socket is offset from the axis of the rotatable shaft; and a locking mechanism for rotatably locking the rotatably lockable gears or pulleys.

In the case of gears, the gears engage each other directly to transfer rotational forces and in the case of pulleys a belt transfers the rotational forces.

At least two, preferably three bearings are provided between the rotatable shaft and the hole defined in the free end of each crank arm. The rotatably lockable gears or pulleys are also mounted on bearings.

It is to be appreciated that once the rotatably lockable gears or pulleys are rotatably locked, the lockable gears or pulleys will not freely rotate with the pedals and the coaxial gear or coaxial pulley, as the case may be, connected to the pedals will then actively engage and rotate about the stationary locked gears or locked stationary pulley to cause a wobble or vibration to the pedals.

It is to be further appreciated that as the pedals rotate, the rotatable shaft will rotate in relation to the locked rotatably lockable and coaxial gear or pulley ratio, which in turn will rotate the offset socket causing the socket and therefore the pedal shaft to move in a circle about the shaft. The circular movement of the offset socket and pedal shaft is experienced by the cyclist as a small wobble or oscillation and at speed a vibration directly transmitted to a person's feet. The amplitude of the wobble or vibration is equal to the offset.

Although a socket is provided to accept of the shelf pedals, it is to be appreciated that pedals can be connected to the rotatable shaft by other means.

In the case of a pulley, a drive belt will connect the stationary pulley and coaxial pulley and the machine may include a belt tensioner mounted near the free end of the crank arms. The belt tensioner will rotate with the free end of the crank arm.

The locking mechanism for rotatably locking the rotatably lockable gears or pulleys may include a retractable laterally extending arm, which arm, when extended, engages with the gear or pulley, as the case may be, to rotatably lock the gear or pulley to prevent rotation of the gear or pulley. The mechanism may preferably include a pair of retractable laterally extending arms to simultaneously engage both gears or pulleys of the pair of gears of pulleys. Each arm may engage a stop protruding from the side of the gear or pulley. Alternatively, each arm may be in the form of a pin and may extend into a hole or slot formed in the side of the gear or pulley.

The locking mechanism may include a housing and a pair of opposed arms mounted inside the housing, which are extendable laterally outward out of the housing. The arms are spring loaded and urged into the retracted position. A wedge shaped cam, which engages the opposed inner ends of the arms is mounted inside the housing. When the cam is moved perpendicular to the arms, the opposed wedge surfaces forces the arms laterally out of the housing into an extended position. The cam may also be spring loaded and urged into a position wherein the opposed surfaces of the narrow part of the wedge engages the opposed arms in which the arms are retracted. The cam is then connected to a cable, which when tensioned moves the cam perpendicular to the arms and the opposed wedge surfaces forces the arms laterally out of the housing into an extended position. The housing is mounted on the bicycle or stationary exercise bicycle such that the laterally extending arms will engage with the respective stops protruding from the side of the gear or pulley. The cable may be connected to a lever, which lever is operable by a person using the bicycle or stationary exercise bicycle.

The gear or pulley ratio of the large stationary gear and the small coaxial gear may preferably selected such that at a typical pedaling cadence range of 70 to 120 revolutions per minute (rpm) the pedal shaft will cycle at 30 to 35 Hertz causing about 2000 vibrations or muscle contractions per minute.

The offset and therefor the amplitude of the wobble or vibration may preferably be between 1 and 5 mm.

The bicycle or stationary exercise bicycle may include known components such a fly wheel which is rotated by a pulley connected to the crank. The bicycle or stationary exercise bicycle may also include known resistance mechanisms to increase drag on the fly wheel. For example, the fly wheel may be ferromagnetic and the resistance mechanism may include a series of magnets which can be selectively engaged with the fly wheel to increase or decrease the resistance on the fly wheel.

In the case of an elliptical exercise type machine or stepping machine, at least one, preferably a pair of releasably lockable rack gears is mounted on each side of the machine;

a pair of footplate carrying arms attached to the machine at one end and which arms are configured to oscillate about the attached end;

a shaft rotatably mounted through a hole defined in the free end of each arm with one end extending inwards towards the machine and provided with a coaxial pinion gear respectively engaging the rack gears with the other outwardly extending end provided with a socket for receiving a shaft of a footplate, which socket is offset from the axis of the rotatable shaft; and a locking mechanism for locking the releasably lockable rack gears in a stationary position.

It to be appreciated that the rack gears when unlocked is unlocked it moves with its associated foot plate and when locked, becomes stationary and the oscillation is activated.

In this embodiment translation forces are transmitted to rotational forces and the rack gears may be straight or shaped in an arc to follow the movement of the reciprocating footplates.

An advantage of the invention is that the vibration source is the pedals or footplate, i.e. the working contact point between a person and the exercise machine and most of the vibrational energy is transmitted directly to the person to give maximum benefit to the person while minimizing the vibration to the bicycle thereby minimizing the destructive effect of vibrations on the bicycle or exercise machine. A further advantage of the bicycle or stationary exercise bicycle embodiment of the invention is that the vibrations are mechanically generated and no electrical motors are required and the machine does not have to be connected to a power source. In addition, the interaction of the gears provide a source of resistance to pedaling, which lowers the required resistance to be provided by the usual resistance means of stationary exercise machines. The main advantage of this invention is the ability to switch the vibrations on or off as required by the user.

DETAILED DESCRIPTION OF THE INVENTION

The invention is now described by way of example with reference to the accompanying drawings.

Figure 1:
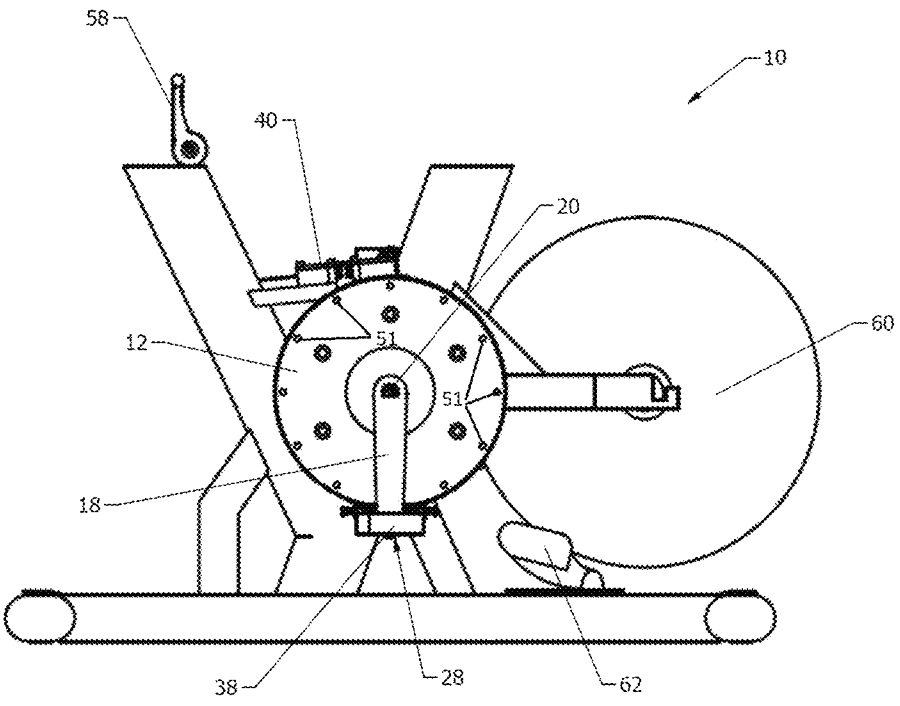
FIG. 1 shows a side view of a stationary exercise bicycle, in accordance with the invention.
Figure 2:
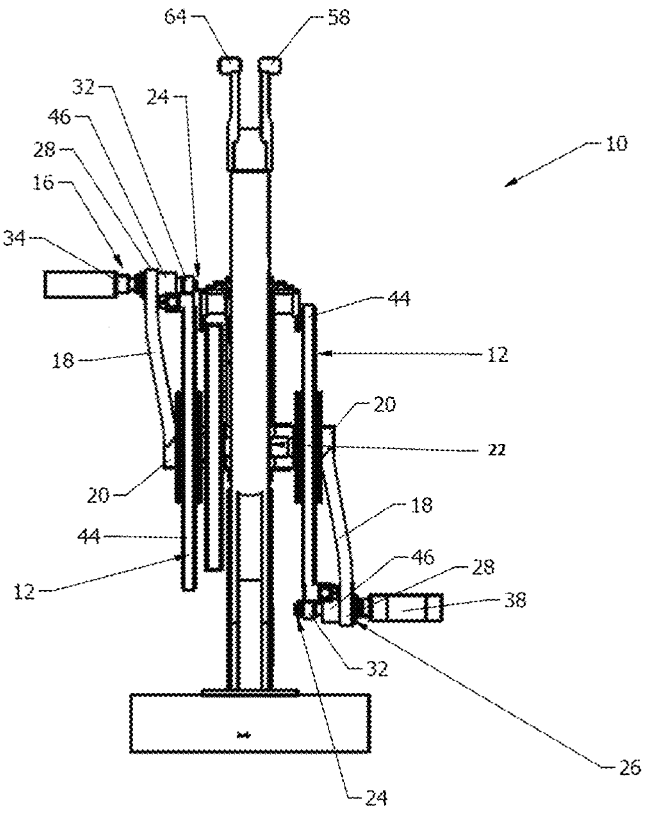
FIG. 2 shows an end view of the stationary exercise bicycle.
Figure 3:
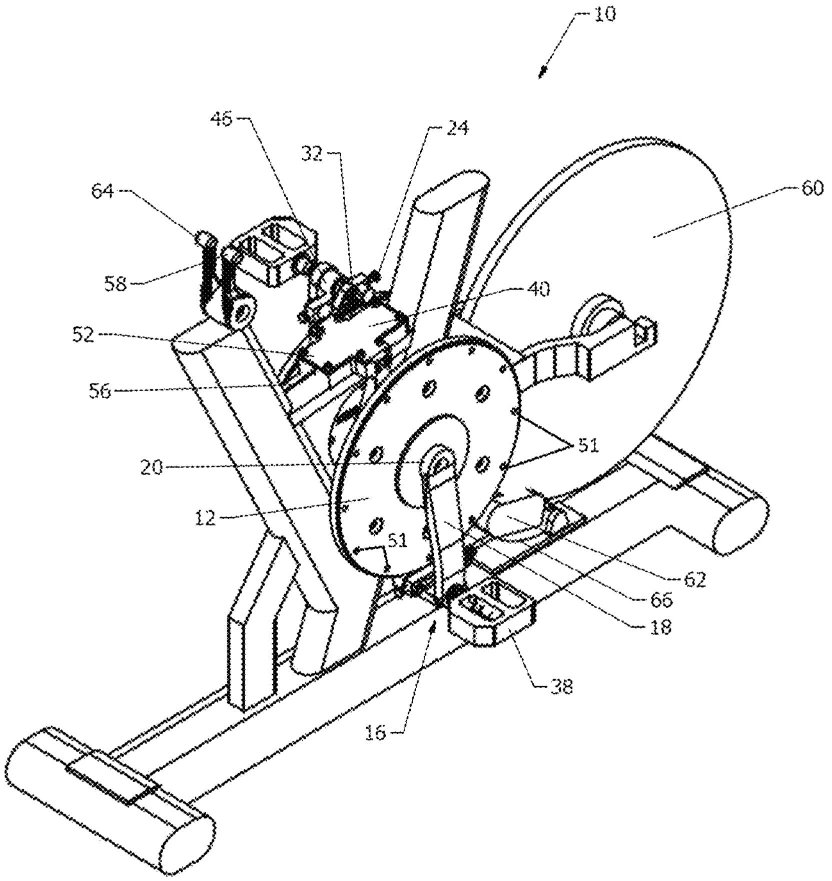
FIG. 3 shows a top left perspective view of the stationary exercise bicycle.

Referring now to the drawings, the exercise machine in the form of a stationary exercise bicycle, in accordance with an example of the invention, is generally indicated by reference numeral 10.

The stationary exercise bicycle 10 comprises a mechanism for vibrating the pedals during exercise. In one embodiment, the exercise bicycle comprises a pair of rotatably lockable pulleys 12 mounted on each side of the bicycle 10. The rotatably lockable pulleys 12 have a circumference similar to the circumference of a virtual circle formed by the rotating pedal shafts 16 of the bicycle. A pair of crank arms 18 rotatably mounted and connected at one end 20 of each crank arm through a bottom bracket 22 of the bicycle 10. A shaft 24 is rotatably mounted through a hole 26 defined in the free end 28 of each crank arm 18 with one end 30 extending inwards towards the bicycle 10 and provided with a coaxial pulley 32 respectively engaging the rotatably lockable pulley 12, with the other outwardly extending end 34 provided with a socket 35 for receiving the shaft 16 of a bicycle pedal 38. The socket 35 is offset from the axis 37 of the rotatable shaft 24. The coaxial pulleys 32 respectively engages the rotationally lockable pulleys 12 by means of a drive belt 44. The drive belt 44 connects the stationary pulleys 12 and coaxial pulleys 32 and the machine includes a belt tensioner 46 mounted near the free end of each crank arm 18. The belt tensioners 46 rotate with the free end of each crank arm 18.

Figure 5:
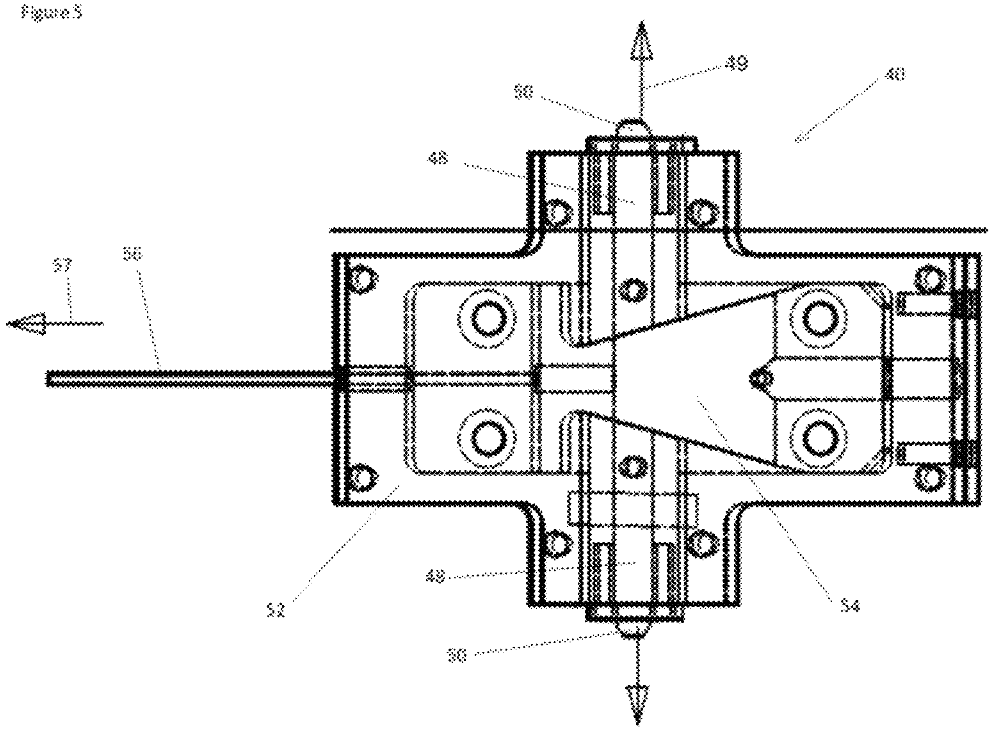
FIG. 5 shows top transparent view of the locking mechanism
Figure 6:
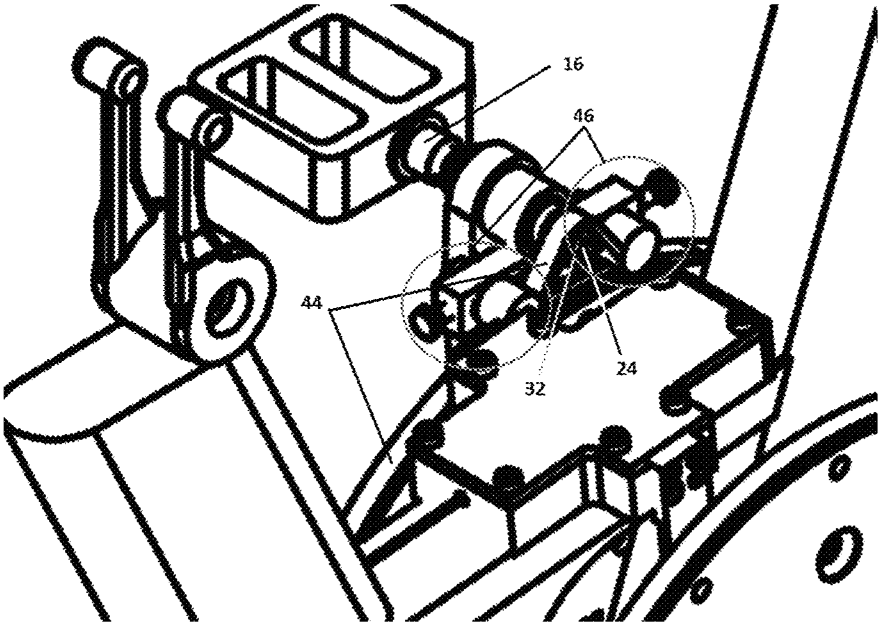
FIG. 6 shows a magnified portion of FIG. 3.
Figure 7:
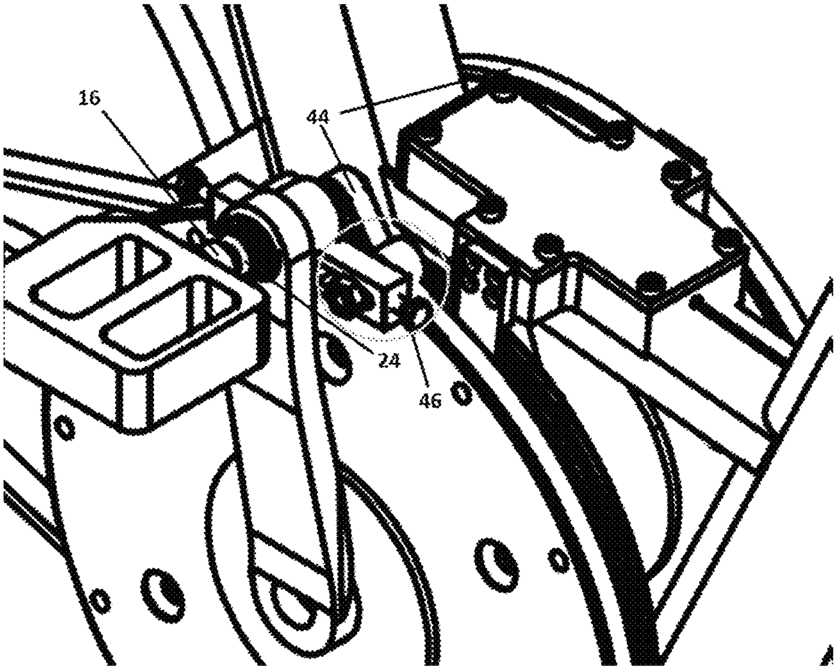
FIG. 7 shows a magnified portion of FIG. 4.
Figure 8:
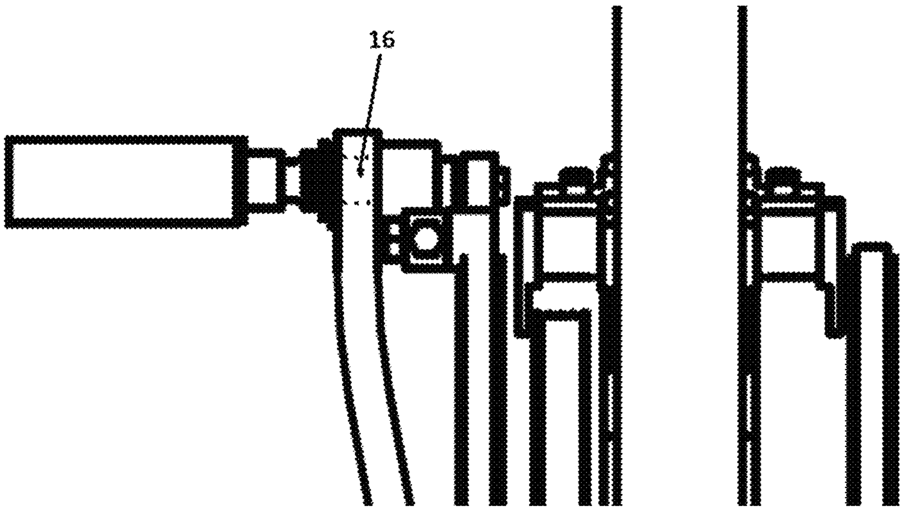
FIG. 8 shows a magnified portion of FIG. 2.
Figure 9:
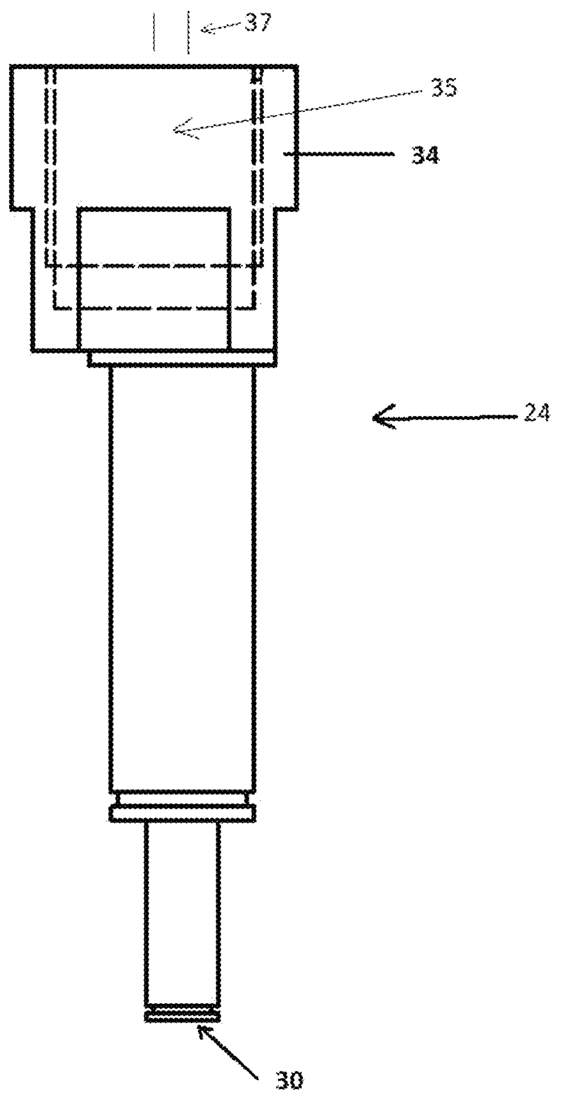
FIG. 9 shows a side view of a pedal shaft.
Figure 10:
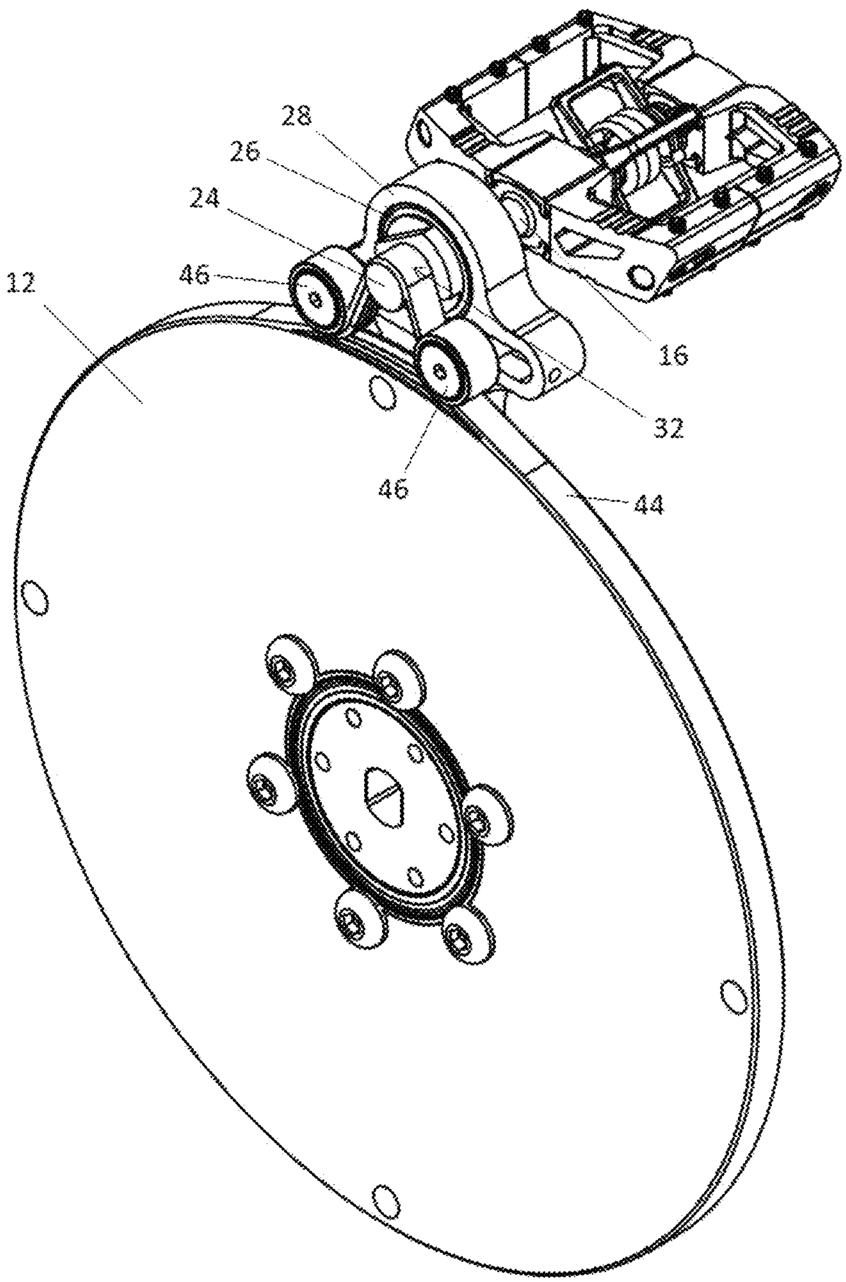
FIG. 10 shows a perspective view of an enlarged portion of the stationary exercise bicycle.
Figure 11:
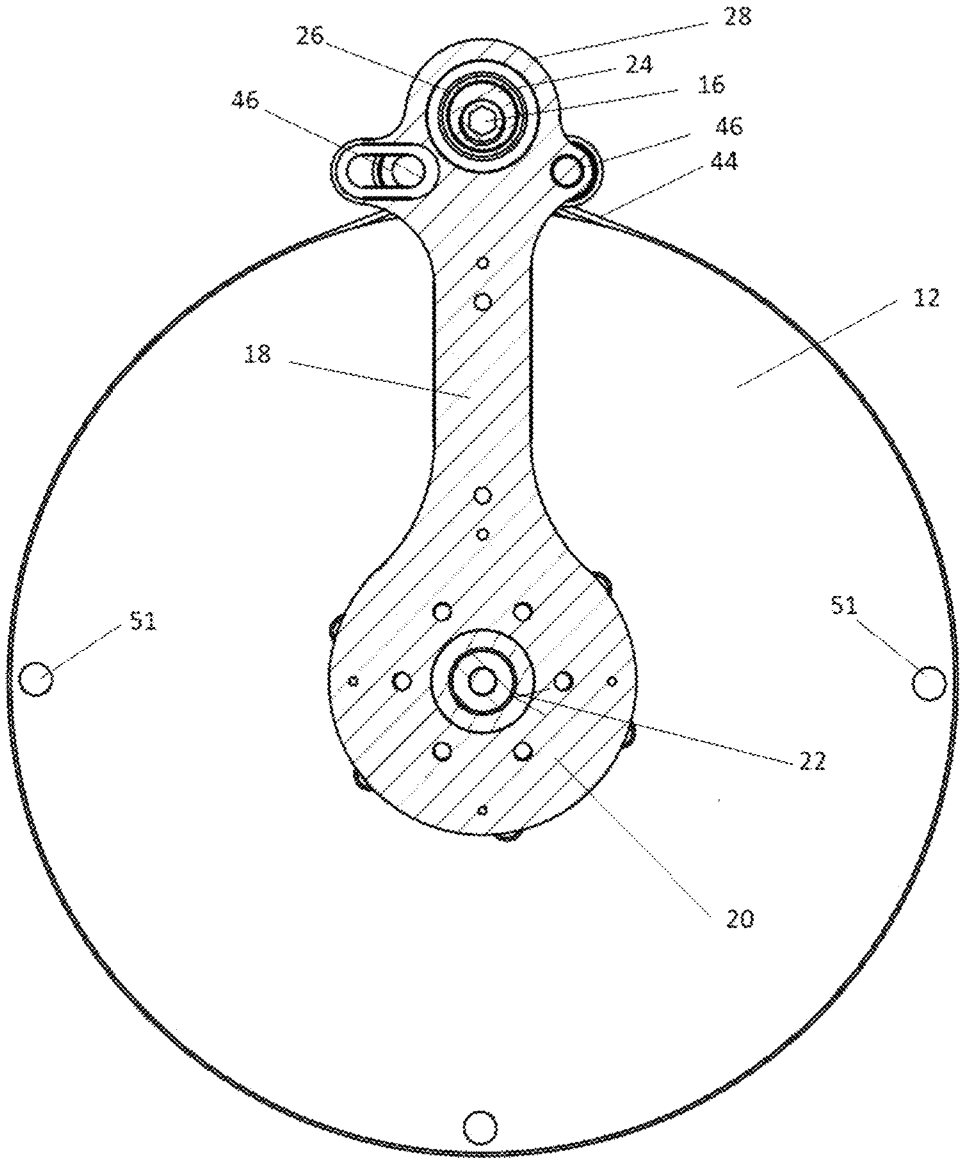
FIG. 11 shows a side sectional view through a crank arm of the stationary exercise bicycle.

The stationary exercise bicycle further includes a locking mechanism 40 for rotatably locking each pulley of the pair of rotatably lockable pulleys 12, shown in FIG. 5. The locking mechanism 40 for rotatably locking the rotatably lockable pulleys 12 includes a pair of retractable laterally extending arms 48, in the direction of the arrows 49, which arms in the form of a pin 50, when extended, engages with a hole 51 in each pulley 12 to prevent rotation of the pulley. The locking mechanism 40 includes a housing 52 with the pair of opposed arms 48 mounted inside the housing, which arms are extendable laterally outward with the pins protruding out of the housing. The arms 48 are spring loaded and urged into the retracted position. A wedge shaped cam 54, which engages the opposed inner ends of the arms is mounted inside the housing 52. When the cam 54 is moved perpendicular to the arms 48, in direction of arrow 57, the opposed wedge surfaces forces the arms 48 laterally out of the housing 52 into an extended position. The cam 54 is also spring loaded and urged into a position wherein the opposed surfaces of the narrow part of the wedge of the cam 54 engages the opposed arms in which the arms 48 are retracted. The cam 54 is connected to a cable 56, which when tensioned moves the cam 54 perpendicular to the arms and the opposed wedge surfaces forces the arms 48 laterally out of the housing 52 into an extended position. The housing 52 is mounted on stationary exercise bicycle 10 such that the laterally extending arms 48 will engage with the respective stops 50 protruding from the side of the pulleys 12. The cable 56 is connected to a lever 58, which lever is operable by a person to move the cable 56 in the direction of the arrow 57 using the stationary exercise bicycle 10.

Figure 4:
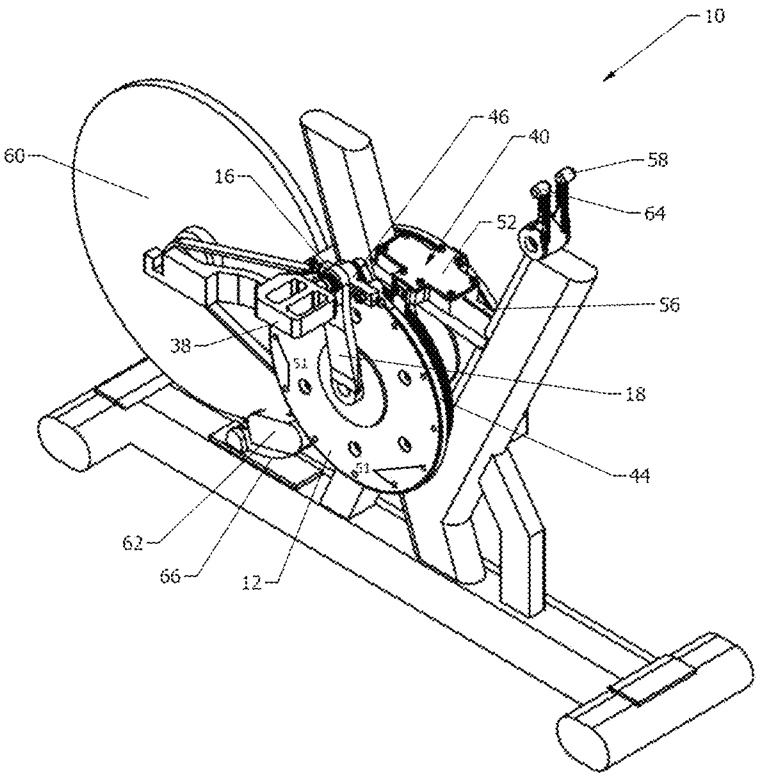
FIG. 4 shows a top right perspective view of the stationary exercise bicycle.

The stationary exercise bicycle 10 includes known components such as a fly wheel 60 which is rotated by each pulley 12 connected to the crank arm 18. The bicycle or stationary exercise bicycle may also include known resistance mechanisms to increase drag on the fly wheel in this case the fly wheel 60 is ferromagnetic iron and the resistance mechanism includes a series of magnets in a u shaped housing 62 which can be selectively engaged with the fly wheel 60 to increase or decrease the resistance on the fly wheel by a lever 64 connected to the housing 62 by a cable 66 (FIG. 4).

It shall be understood that the examples are provided for illustrating the invention further and to assist a person skilled in the art with understanding the invention and are not meant to be construed as unduly limiting the reasonable scope of the invention.

The invention claimed is:

1. A stationary exercise bicycle, the stationary exercise bicycle comprising:

a pair of rotatably lockable pulleys respectively mounted on each side of the stationary exercise bicycle and with a circumference similar to a rotation circumference of a pair of rotating pedal shafts of the stationary exercise bicycle;

a pair of crank arms rotatably mounted to the stationary exercise bicycle, wherein one end of each crank arm of the pair of crank arms is connected through a bottom bracket of the stationary exercise bicycle wherein the bottom bracket extends through a middle of the pair of rotatably lockable pulleys;

a pair of shafts, wherein each shaft of the pair of shafts is rotatably mounted through a hole defined in a free end of a respective crank arm of the pair of crank arms with one end of the respective shaft extending inwards towards the stationary exercise bicycle and provided with a coaxial pulley respectively engaging a respective rotatably lockable pulley of the pair of rotatably lockable pulleys with an outwardly extending end of the respective shaft provided with a socket for receiving a respective rotating pedal shaft of the pair of rotating pedal shafts of a bicycle pedal, wherein the socket is offset from an axis of the shaft; and a locking mechanism for rotatably locking the pair of rotatably lockable pulleys.

2. The stationary exercise bicycle as claimed in claim 1, wherein the locking mechanism for rotatably locking the pair of rotatably lockable pulleys includes a pair of retractable laterally extending arms, wherein each of the pair of retractable laterally extending arms, when extended, engages with the pair of rotatably lockable pulleys to rotatably lock the pair of rotatably lockable pulleys to prevent rotation of the pair of rotatably lockable pulleys.

3. The stationary exercise bicycle as claimed in claim 2, wherein the pair of retractable laterally extending arms simultaneously engage the pair of rotatably lockable pulleys.

4. The stationary exercise bicycle as claimed in claim 3, wherein each arm of the pair of retractable laterally extending arms is in the form of a pin and extends into a respective hole formed in a respective side of the pair of rotatably lockable pulleys to lock the pair of rotatably lockable pulleys.

5. The stationary exercise bicycle as claimed in claim 4, wherein the locking mechanism includes a housing and the pair of retractable laterally extending arms mounted inside the housing, wherein the pair of retractable laterally extending arms are extendable laterally outward out of the housing.

* * * * *